United States Patent [19]

Kerr

[11] Patent Number: 5,240,269
[45] Date of Patent: Aug. 31, 1993

[54] BIKE SUSPENSION

[75] Inventor: Ronald W. Kerr, St. Charles, Ill.

[73] Assignee: Miner Enterprises, Inc., Geneva, Ill.

[21] Appl. No.: 821,528

[22] Filed: Jan. 16, 1992

[51] Int. Cl.[5] .......................... B62K 25/00; F16F 1/34
[52] U.S. Cl. ................................. 280/285; 267/141.1; 267/153; 267/294
[58] Field of Search ............... 280/283, 284, 285, 286, 280/710, 716; 267/153, 294, 141.1

[56] References Cited

U.S. PATENT DOCUMENTS 2,670,200  2/1954  Seddon .............................. 267/294
3,259,397  7/1966  Doennecke ........................ 267/294

Primary Examiner—Mitchell J. Hill

[57] ABSTRACT

A suspension device employed between the rear wheel and the frame of a mountain bike. A lever arm pivoted to the frame carries the rear wheel at one end and the suspension device at the other. The rear wheel portion of the lever arm is about four times as long as is the suspension device portion. The suspension device includes a hollow elongated elastomeric spring carrying an aluminum telescoping portion. The telescoping portion supports the elastomer while allowing reciprocating movement along a major axis, but not allowing any rotational movement around that same axis.

8 Claims, 3 Drawing Sheets

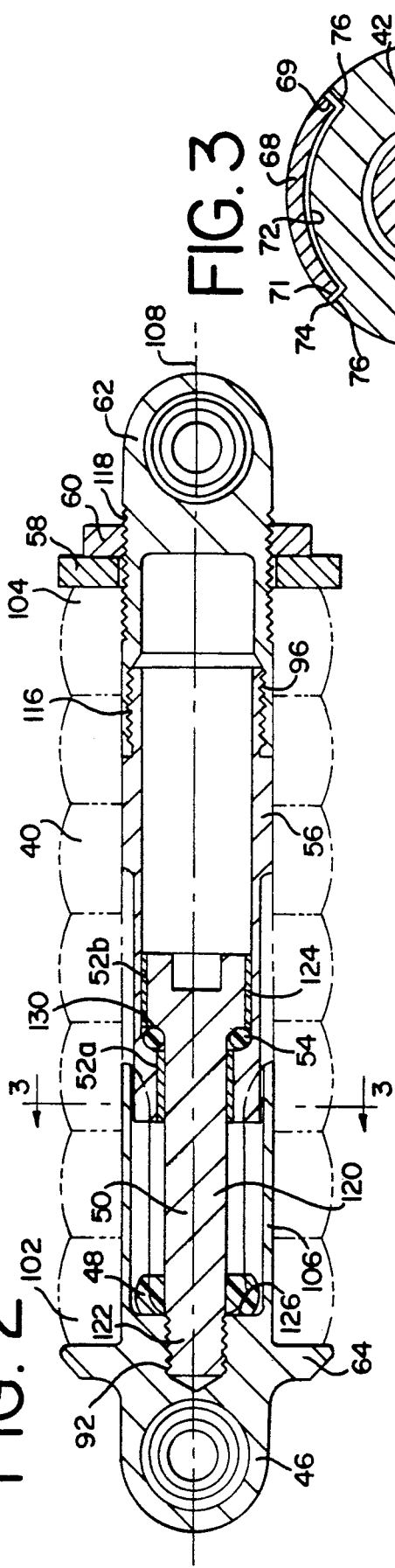
FIG. 2
FIG. 3
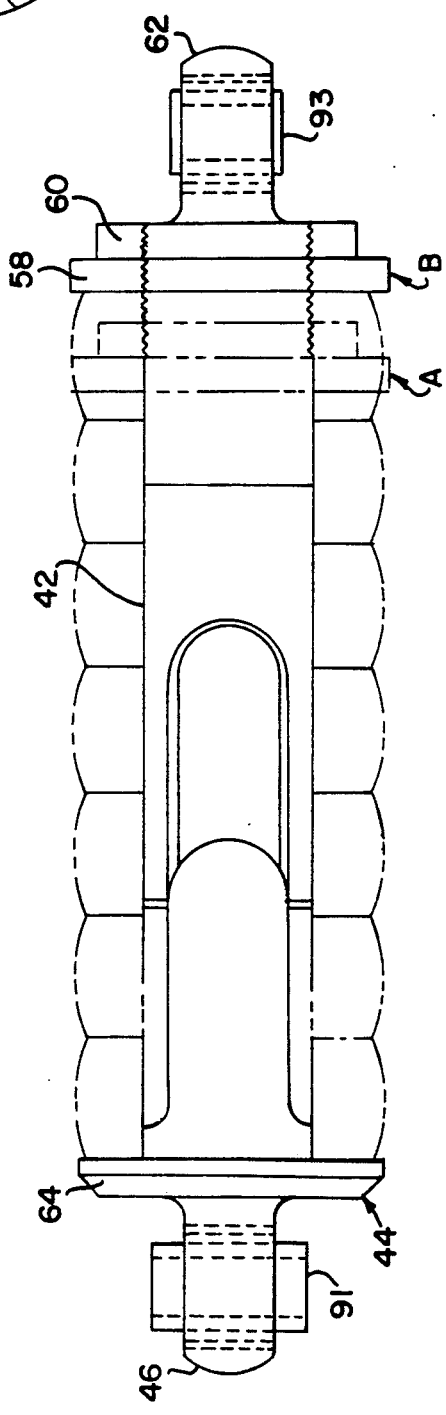
FIG. 4

BIKE SUSPENSION

BACKGROUND OF THE INVENTION

This invention relates to a mountain-type bicycle and more particularly to a rear suspension system for use on such bicycles. The mountain bike is a relatively new type of bicycle. It is a cross breed of the European racing technology and the utility bike. It was first developed in California by a man named Michael Sinyard in 1981. The suggestion has been made that the mountain and the sales generated thereby have transformed the U.S. bicycle industry into a 3.5 billion dollar family sports industry. Today more than 93 million Americans ride bicycles. Some 25 million of these ride at least once a week. Further, in 1990 Americans bought 10.8 million bicycles against 9.3 million cars. It is believed that the growing boom in mountain bikes sales is in part due to the aging of the population. In this form of hi-tech sports magic, is presented a bicycle which is more forgiving to the overtaxed grown-ups and is a ticket to an activity usually ruled by youth and muscle.

The mountain bikes on the market each day employ sophisticated metal alloys, carbon fibre tubing, titanium lugs and other material from aerospace industry. The result is a high strength lightweight structure. For example, the average weight of a mountain bike is approximately 28 lbs. vs. 20 lbs. for the far more fragile touring bike. Thick tires, upright seating and flat handlebars are also features that have practical appeal both for the rough riding wilderness cyclist and the ordinary weekend biker. It is through this dynamic change in materials, styling and inventive skills that have propelled American bicycle designers to the head of a global business long dominated by Italian manufacturers.

SUMMARY OF THE INVENTION

The invention hereunder consideration is designed to be employed with a dual suspension mountain bike. For example, a 9000 Series as manufactured by the Trek Bicycle Company based in Waterloo, Wis. In order to maximize balance and handling, the rear suspension hereunder consideration is located essentially at the dynamic center of gravity. A swing arm is the sole connection between the frame of the bicycle and the rear wheel, connection being at the swing arm pivot point. In a preferred embodiment, the length of the swing arm form the pivot point to the rear axle, in relationship to the length from the pivot point to the shock absorber connection is about 4 to 1. Thus, a one inch travel of the shock absorber would allow for a 4" vertical travel of the rear axle. The shock absorber itself includes a segmented energy absorbing elastomeric unit manufactured and sold by Miner Enterprises, Inc. under the Trademark "TECSPAK ®". Carried within the bore are the components of the telescoping portion. At one end of the telescoping portion, a flanged clevis end with a shoulder is provided to serve as a positive abutment for the elastomeric pad stack. At the other end a threaded clevis end carrying a load washer and adjustable nut is provided to allow the rider to set the preload depending upon his weight or desired ride characteristics. The actual parts of the telescoping portion which are carried within and sealed by the elastomeric pad stack, are arranged as such that the two clevis ends can move independently and yet substantially support the elastomeric pad stack around its substantially complete inner wall. Incorporated within the telescoping member are finger-like prongs secured to one clevis end flange which cooperates with a slotted section that is secured to the other clevis end flange. At all times the prong is at least partially within the slotted section and thus reciprocating movement is permitted while any rotation of one clevis end to the other along the major axis is prevented. Thus, a load nut which is provided to set the desired preload, will not walk one way or the other because of rotation of the two clevis ends around their major axis. Further, the segmented model block of elastomeric material is substantially supported along its entire length and thus any random gripping during the work cycle is substantially lessened. Such random gripping would undesirably influence the force travel curve during a work cycle. Other features will be in part apparent and in part pointed out hereafter.

BRIEF DESCRIPTION OF THE DRAWINGS

FIG. 2 is a cross-sectional view of the shock absorber of FIG. 1 with the cut being made parallel with the plane of the paper;

FIG. 3 represents a cross-sectional view taken along the lines 3—3 of FIG. 2;

FIG. 4 represents a fragmentary side elevation of the shock absorber shown in FIG. 2 showing the relationship of the prong end slot;

DETAILED DESCRIPTION OF A PREFERRED EMBODIMENT

Figure 1:
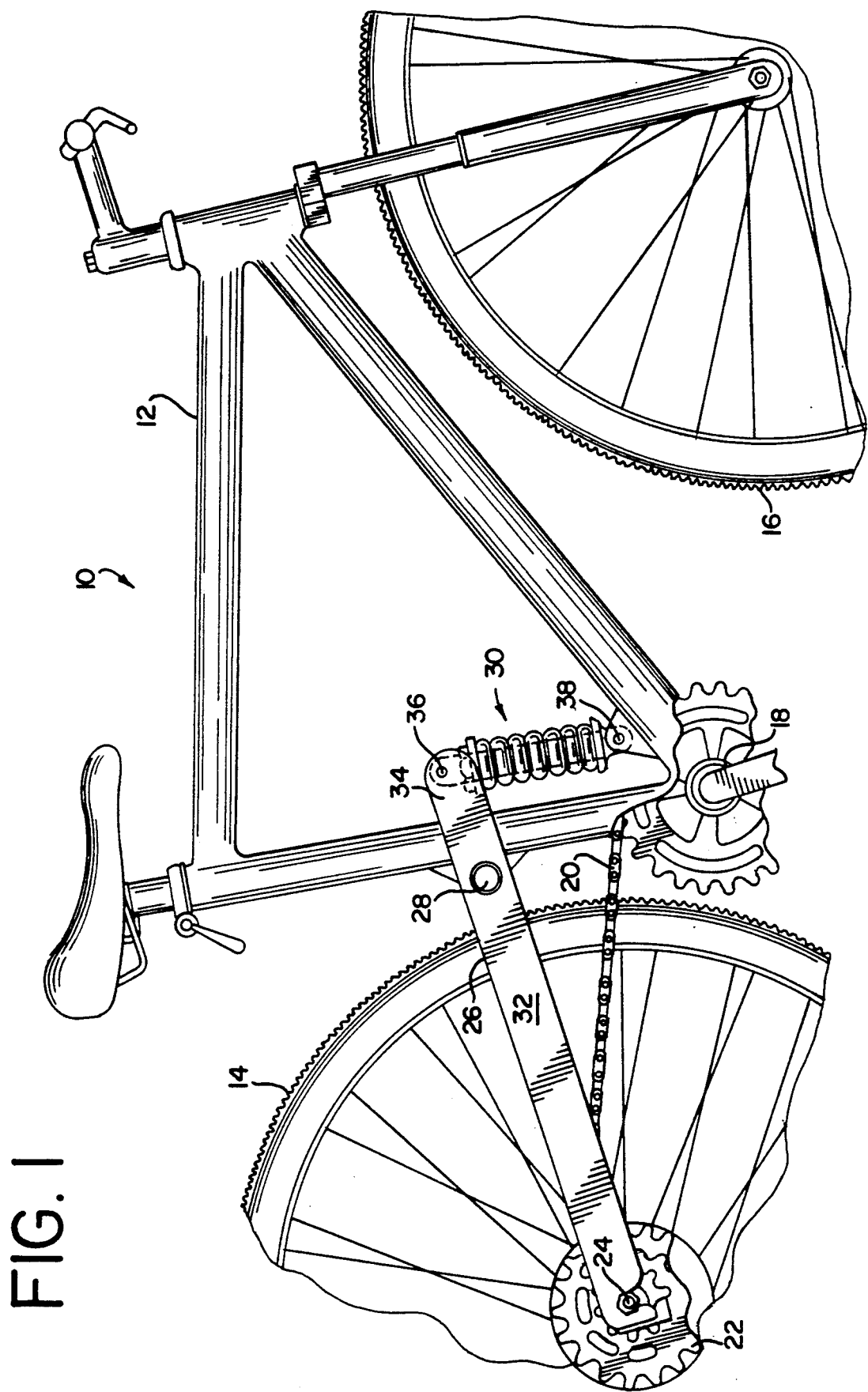
FIG. 1 is a partial representation of a mountain bike incorporating the suspension device of the present invention.

Referring now the drawings and in particular to FIG. 1 where is generally indicated a mountain bike 10. As stated, this particular bike is manufactured by the Trek Corporation of Waterloo, Wis. and is known as the 9000 Sports.

Very briefly, the mountain bike 10 includes a frame 12; a rear wheel 14; a front wheel 16; a crank 18; a chain 20; a sprocket 22; a rear axle 24; a swing arm pivot point 28 and a segmented monoblock elastomeric pad stack 30. The swing arm pivot point 28 divides essentially a swing or lever arm 26 into a first arm part 32 and a second arm part 34. The relationship between these two parts with respect to their length is about 4 to 1. Thus, it is apparent that a travel of 1" by the center of pin 36 will correspond to a travel in the center of the axle 24 of about 4". As is apparent from a consideration of FIG. 1, the pin 36 secures the suspension device 30 to the second arm portion 34 of the swing arm 26. A second pin 38 secures the suspension device 30 to the frame 12 of the mountain bike 10.

Reference is now had to FIGS. 2-8 wherein is shown in detail the suspension device 30 which is the subject of the invention hereunder consideration. First referring to FIG. 2, the various parts and components of the suspension device 30 are shown. In essence the suspension device 30 consists of a segmented monoblock elastomeric pad stack 40 having first and second ends 102 and 104, a major axis 108 down the center and a bore 42 running the length thereof. Carried within the bore 42 is the telescoping portion 44 that includes: a flanged clevis end 46; an elastomeric over-travel stop 48; an inner rod 50; bearings 52a and b; elastomeric rebound cushion 54; an outer tube 56; a load washer 58; a load nut 60 and a threaded clevis end 62. It must be understood that all of these elements have the same major axis as said pad stack 40 which is major axis 108. When in operation, the segmented elastomeric monoblock is subjected to a preload by the rotation of the load nut. As a result, the first end 102 of said elastomeric monoblock 40 abuts against the shoulder or flange 64 and the second end 104 abuts the load washer 58. Thus, the elastomeric monoblock 40 also functions as an effective seal against dirt, etc. from contaminating the moving parts of the telescoping portion 44 and a variable preload is possible.

In a preferred embodiment, the elastomeric monoblock 40, the elastomeric over-travel stop 48 and the elastomeric rebound cushion 54 are formed of an elastomer having tensile characteristics such that the ratio of plastic strain to elastic strain is greater than 1.5 to 1. One such elastomer is a copolyester polymer elastomer manufactured and sold by E.I. de Pont de Nemoirs under the Trademark "HYTREL®". It is reasonably inert and significantly, it is quite durable Moreover, this elastomer is not subject to tearing or to crack propagation even when made in relatively thin cross sections. Further treatment of these three elastomeric components are in accordance with the teachings of Anderson U.S. Pat. Nos. 4,198,037 and 4,566,678. As a result of this treatment, the three elastomeric components are converted to a product manufactured and sold by Miner Enterprises, Inc. under the Trademark "TECSPAK®". The above two Anderson patents are incorporated herein by reference and thus, no further discussion will be had thereto.

Clevis end flange 46 as is apparent by reference to FIG. 1, is secured by pin 36 to the second swing arm portion 34. The threaded clevis end 62, in turn, secured by a pin 38 to the frame 12 of the bicycle 10. The operator via the use of a tool then has the option to rotate one way or the other the load nut 60 to adjust the preload to his satisfaction. Referring to FIG. 4, phantom position A shows the load nut 60 tightened to the maximum extent such as would be recommended for a rider or load of about 220 kg. Position B would be recommended for a load of about 100 kg, but at either setting at least one inch of travel is possible. An understanding of the manner in which this preload/travel relationship is accomplished is critical to appreciating the invention hereunder consideration. Initially it is understood that the elastomeric monoblock 40 has a predefined force/travel curve and that by varying the preload you are simply moving to different starting points on that curve. A preload placed on the suspension device 30 results in a compressive load being placed on the elastomeric rebound cushion 54. That is as the preload increases the inner rod 50 is urged to the left in FIGS. 2 and 4, while the outer tube 56 is urged to the right. As is apparent, once the rebound cushion 54 goes solid, no further expansion is possible. The travel of the suspension device 30, however, is determined by the distance that the abutting end 128 of outer tube 56 can move toward inner wall 126 of flanged clevis end 46. That movement and/or distance is fixed at the point at which the over-travel stop 48 goes solid.

Figure 5:
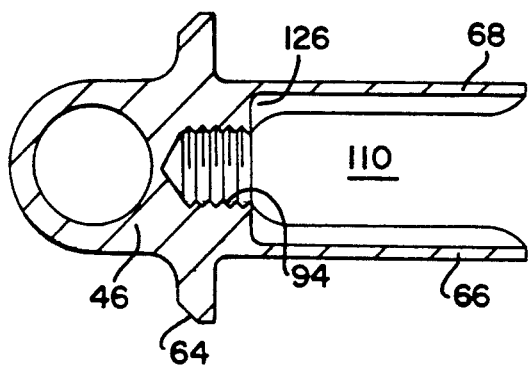
FIG. 5 represents a side elevation of the clevis end flange.
Figure 6:
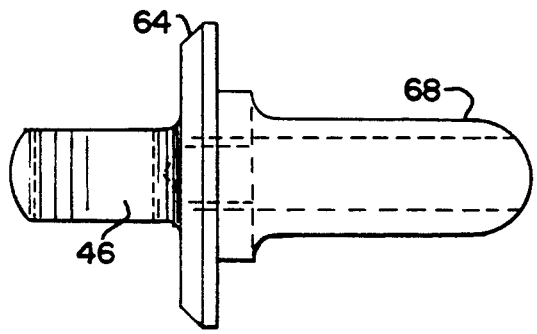
FIG. 6 represents a side elevation taken from the top of the clevis end flange shown in FIG. 5.
Figure 7:
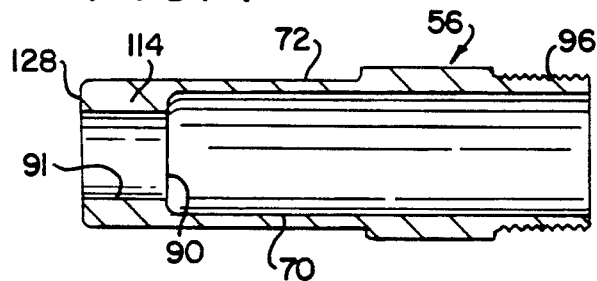
FIG. 7 is a side elevational view of the outer tube as shown in FIG. 2.
Figure 8:
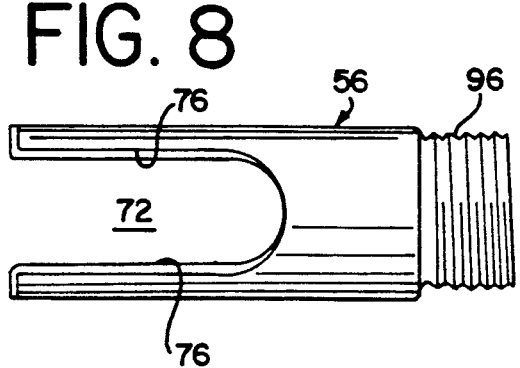
FIG. 8 is a top view of the outer tube as shown in FIG. 7.

Thus, it is apparent that the variance of the preload on the suspension device 30 does not affect the over-all travel thereof. The clevis end flange 46 includes a pair of curved finger-like prongs 66 and 68 that define a centered bore 110 and which cooperate with slotted sections or grooves 70 and 72 cut in the outer tube 56 as shown in FIGS. 7 and 8. It should be noted by a consideration of FIG. 3 that only a small gap, such as 74 is provided between the prong edges 69, 71 and the walls of the slot 76. As a result there is freedom for telescoping movement, but rotation around the major axis of the unit is essentially prohibited. The outer tube 56 as shown in FIG. 7 also includes a horizontally extending bore 112 portion having a restricted portion 114 and an abutting end 128 opposite said threaded portion 96. Considering of FIG. 4 wherein the load nut 60 has begun initial engagement of the threaded portion 80 rendered it apparent that the prongs 66 and 68 are always carried in the slots 70 and 72 as shown in FIGS. 5, 7, and 8. That is, it is not possible to back off the load nut to such an extent whereby the unit can properly function and not have the prongs 66 and 68 engaged with the slots 70 and 72.

This arrangement of elements thus allows adjustment of the preload to accommodate a rider over a weight range of from 125 lbs to 250 lbs and yet still provides for at least 1 inch of travel. This is irrespective of how high the preload due to load on the bike at least 1 inch of travel is possible by the shock absorber 30.

In order to ensure against destruction of the unit due to some unforeseen shock, over-travel stops 48 and rebound cushions 54 are provided, the over-travel stop 48 being located within the partial central bore 110, adjacent the threaded bore 94 and against the inner wall 126. The rebound cushion 54 is located in the horizontally extending bore 112 adjacent to the restricted portion 114 and against the inside wall 90. In practice, the inner rod 50, which includes a horizontally extending body portion 120, a threaded end 122, a shoulder 130 and an expanded end 124, journals both the elastomeric over-travel stop 48 and the elastomeric rebound cushion 54. For example, in the event of a massive load being suddenly placed upon the suspension device 30, the abutting end 128 of the outer tube 56 would contact the over-travel stop 48 and compress it against the wall 126 of the clevis end flange 46. At the other extreme in the event that the suspension unit 30 is forcibly extended, the rebound cushion 54 is compressed between the shoulder 130 on the inner rod 50 and the inside wall 90 of outer tube 56.

The assembly procedures are relatively straightforward and will be hereafter discussed on a step-by-step basis. Initially, the rebound cushion 54 is slid over the inner rod 50 until it contacts the shoulder 130 thereof. This assembly is then slid through the outer tube 56 passing through the aperture 91. Next, the over-travel stop 48 is slid over the inner rod 50, the threaded portion 92 thereof is then screwed into the threaded bore 94 as shown in FIG. 5 of the clevis end flange 46. The next step consists of engaging first threaded portion 116 of the threaded end clevis 62 with the threaded portion 96 of the outer tube 56. The segmented elastomeric monoblock pad stack is then slid over the telescopic housing. The load washer 58 is placed on top of the pad stack and an external force is exerted thereagainst to compress the elastomeric pad stack. The load nut 60 is then engaged with the second outside threaded portion 118 until all threads are just even, as shown in position B in FIG. 4.

In a preferred embodiment the final step consists in the pressing in of first and second end bushings 91 and 93.

The various embodiments of the invention are set forth above by way of example. It will be appreciated to those skilled in the art that modifications can be made to the method and apparatus of this invention without departing from the spirit and scope of the invention as set forth in the accompanying claims.

I claim:

1. A suspension device employed between the frame of a bike and the rear wheel comprising:

an elastomeric spring having first and second ends, a major axis and a bore extending along said major axis;

a telescoping portion carried within said bore and including a flanged clevis end, an elastomeric over-travel stop, an inner rod, an elastomeric rebound cushion, an outer tube, a load washer, a load nut and a threaded clevis end;

said flanged clevis end includes a pair of curved finger-like prongs defining a partial central bore, a flange and a threaded bore;

said outer tube includes slotted sections which mate with said curved finger-like prongs whereby circular movement around said major axis is prevented, a horizontally extending bore portion having a restricted portion and a threaded portion;

said over-travel stop being located within said partial central bore and adjacent said threaded bore and said rebound cushion being located in said horizontally extending bore portion adjacent said restricted portion;

said inner rod being partially carried within said horizontally extending bore portion journaling both said over-travel stop and said rebound cushion;

said threaded clevis end having a first inside and a second outside threaded portion, said first inside threaded portion engaging with the threaded portion of said outer tube;

said load washer journaling said second outside threaded portion and said load nut engages said second outside threaded portion whereby said first end of said elastomeric spring abuts said flange and said second end abuts said load washer so that upon rotation of said load nut on said second outside threaded portion said elastomeric spring will be subjected to a variable preload.

2. The suspension device of claim 1 wherein said inner rod has a horizontally extending body portion, a threaded end and an expanded end, said threaded end engaging said threaded bore of said flanged clevis end.

3. The suspension device of claim 2 wherein said telescoping portion has a travel of at least one inch.

4. The suspension device of claim 3 wherein the partial central bore of said flanged clevis end has an inner wall and said outer tube has an abutting end opposite said threaded portion whereby upon over-travel said over-travel stop is compressed between said inner wall and said abutting end.

5. The suspension device of claim 4 wherein said restricted portion of said outer tube has an inside wall and said expanded end of said inner rod includes a shoulder whereby upon rebounding, said elastomeric rebound cushion is compressed between said inside wall and said shoulder.

6. The suspension device of claim 5 wherein said bike has a swing arm, said swing arm includes a first arm part and a second arm part wherein the relationship of the length of said first arm to said second arm is about 4 to 1, and said flanged clevis end is secured to said second arm part.

7. The suspension device of claim 6 wherein said first arm part and said second arm part are separated by a pivot point, said pivot point being secured to said frame of said bike and said first arm part has an end, said end being secured to said rear wheel and said second arm part has an end, said end being secured to said flanged clevis end.

8. A suspension device employed absorbing shock between the rear wheel and the frame of a bike comprising:

a lever arm including first and second arm parts, said first arm part carrying said rear wheel and said second arm part carrying said suspension device, and a swing arm pivot point securing the lever arm to the frame of the bike whereby the length of the first arm part is about four times as long as said second arm part;

said suspension device including:

an elastomer spring having a major axis and a bore extending along said major axis;

a telescoping portion partially carried within said bore having a flanged clevis end, an inner rod, an outer tube and a threaded clevis end, said flanged clevis end being connected to said second arm part and said threaded clevis end being connected to said frame;

said flange clevis end includes a pair of curved finger-like prongs; and said outer tube includes slotted sections which mate with said curved finger-like prongs whereby circular movement around said major axis is prevented and reciprocating movement along said major axis of at least one inch is allowed.

* * * * *